Feb. 2, 1954    A. L. LEE    2,667,888
FOLLOW-UP VALVE FOR VEHICLE BRAKE OPERATING MECHANISMS
Original Filed Aug. 30, 1947    3 Sheets-Sheet 1

INVENTOR;
ARTHUR L. LEE,
BY
ATT'Y.

Feb. 2, 1954 A. L. LEE 2,667,888
FOLLOW-UP VALVE FOR VEHICLE BRAKE OPERATING MECHANISMS
Original Filed Aug. 30, 1947 3 Sheets-Sheet 2
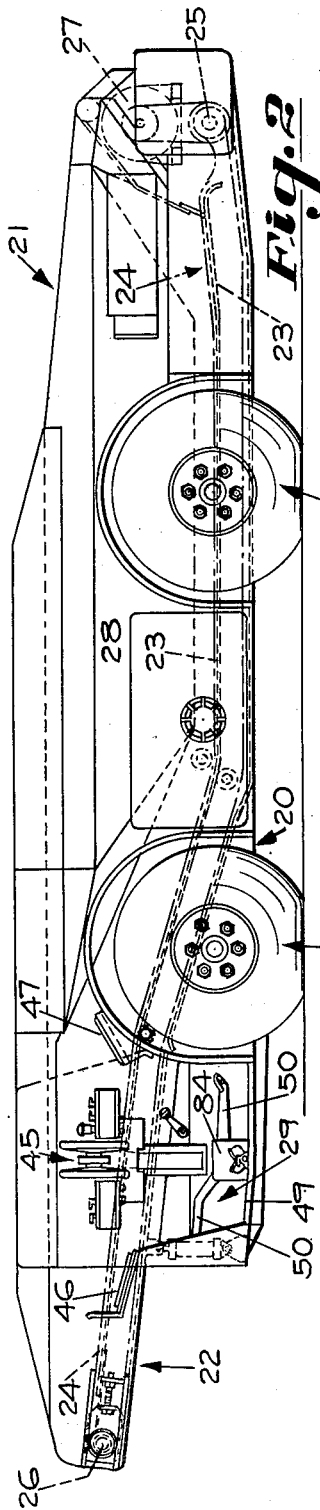
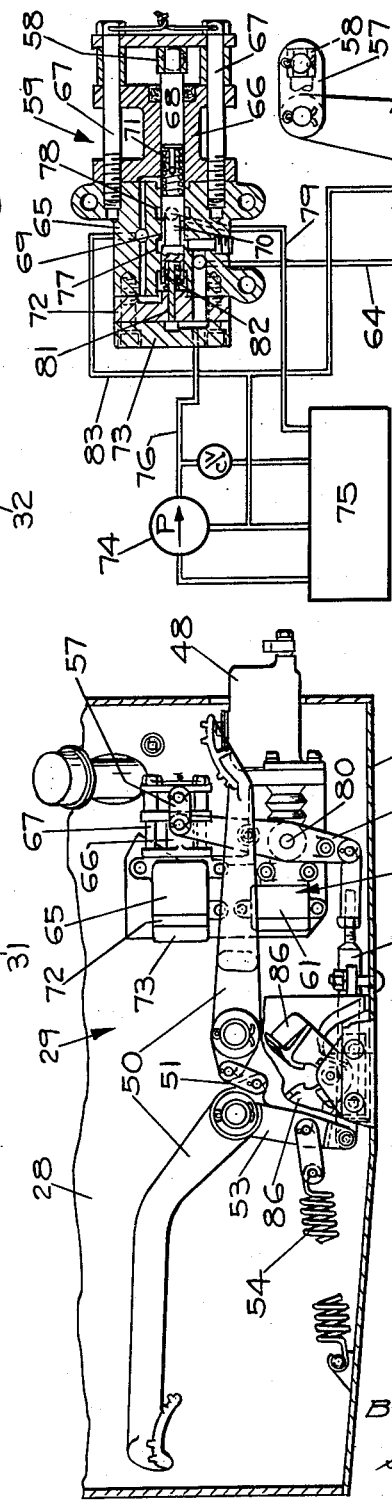
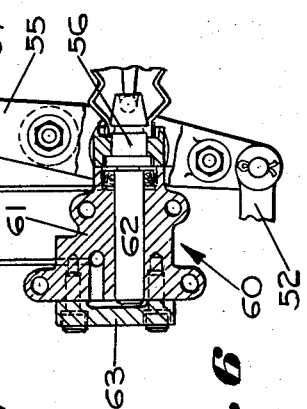
INVENTOR;
ARTHUR L. LEE,
By
ATT'Y.

INVENTOR,
ARTHUR L. LEE,
ATT'Y.

Patented Feb. 2, 1954

2,667,888

UNITED STATES PATENT OFFICE 2,667,888

FOLLOW-UP VALVE FOR VEHICLE BRAKE OPERATING MECHANISMS

Arthur L. Lee, Upper Arlington, Ohio, assignor to The Jeffrey Manufacturing Company, a corporation of Ohio Original application August 30, 1947, Serial No. 771,542, now Patent No. 2,618,491, dated November 18, 1952. Divided and this application January 3, 1951, Serial No. 204,215

1 Claim. (Cl. 137—115)

This invention relates to a vehicle including brake operating mechanism for use in a vehicle which may be, for example, a shuttle car designed particularly for carrying loose material, such as coal, between a loading machine adapted to operate in a coal mine room, or the like, and an entry conveyer or mine cars.

An object of the invention, therefore, is to provide improved follow-up valve mechanism for use in the brake operating mechanism of a vehicle, such as a shuttle car.

Still another object of the invention is to provide, in combination with a vehicle having a hydraulic brake booster motor, a hydraulic system that includes said hydraulic motor and a pump that is operable when the vehicle moves, the system also including a valve for by-passing or directing the output fluid of the pump to the motor as desired.

Other objects of the invention will appear hereinafter, the novel features and combinations being set forth in the appended claim.

In the accompanying drawings,

Fig. 2 is a side elevational view of the vehicle seen in Fig. 1;

Fig. 4 is an elevational view of the apparatus of Fig. 3;

Fig. 6 is a combination piping diagram and a sectional view of follow-up power booster mechanism for the brakes of the vehicle.

This application is a division of my co-pending application, Serial No. 771,542, filed August 30, 1947, now Patent No. 2,618,491, granted November 18, 1952, for a shuttle car. It is to be understood that the construction and operation of the shuttle car of this application follows that of my parent application, above identified, and that only the subject matter pertinent to the present invention is discussed here in detail.

Figure 1:
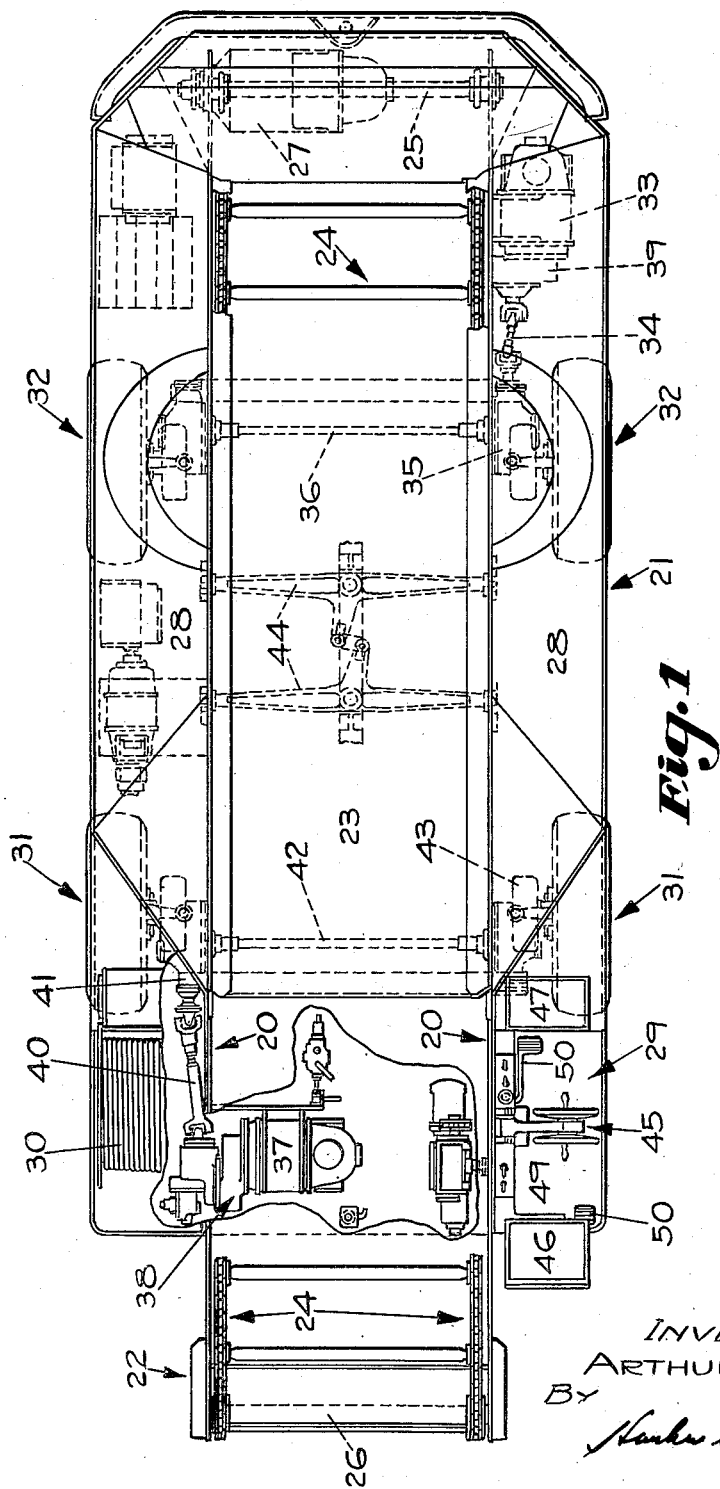
Fig. 1 is a plan view of a shuttle car incorporating the features of my invention with parts broken away.

Referring particularly to Figs. 1 and 2 of the drawings, the shuttle car, incorporating the features of my invention, includes a main frame 20. Mounted on said main frame 20 is an elongated, longitudinally extending body 21, adjacent the rear or discharge end of which there is a chute 22 adapted to overhang a mine car or entry conveyer, from which coal from the body 21 is discharged. The bottom of the coal-carrying body 21 is formed by a bottom plate 23 of substantially uniform width extending over a path which varies in elevation, as clearly illustrated in Fig. 2 of the drawings. An endless chain and flight conveyer 24 has its upper or working run traveling over the bottom plate 23, with its return run traveling beneath said bottom plate 23. Conveyer 24 extends between a head shaft 25 and a foot, tail, or discharge shaft 26, the former of which is driven through an appropriate chain and sprocket drive mechanism from an electric motor 27.

As seen by reference to Figs. 1 and 2 of the drawings, the body 21 includes laterally spaced side walls 28 which are in part vertical and in part laterally sloping, to provide a maximum load carrying capacity for any given height of the shuttle car. The side walls 28 converge adjacent the discharge end of the body and extend upright throughout the length of the discharge chute 22, thereby providing an operator's station 29 adjacent one side of the vehicle and within the extreme lateral confines thereof and adjacent said chute 22. At a similar position on the opposite side of the chute 22 an electric cable reel 30 is located by which electric current may be derived for the several electric motors provided on the shuttle car.

The shuttle car is provided with four wheels, preferably provided with pneumatic tires, there being a pair of wheels 31 adjacent the rear or discharge end and a pair of wheels 32 adjacent the front end.

One of the features of the shuttle car which is of considerable practical importance and which is broadly disclosed and claimed in my Patent No. 2,457,569, dated December 23, 1949, is the provision of driving means for the wheels 31 and 32 so that the wheels 31 adjacent one end of the vehicle are driven by one electric motor through a differential which is located adjacent one of the wheels and outside of the main frame and body of the vehicle, there being a similar drive gearing for the pair of wheels 31 adjacent the other end of the vehicle, also driven through a differential located outside the main frame and body by a separate electric motor.

Referring to Fig. 1 of the drawings, it will be seen that an electric motor 33 drives a shaft 34 through a universal joint, which shaft is connected through a second universal joint through a differential 35 mounted to a casing, the casing in turn being mounted to the main frame 20 outside the shuttle car. The differentially connected shafts of the differential 35 drive a laterally extending shaft 36 which extends to reduction gearing in a housing similar to the housing of the differential 35 within which differential mechanism has been eliminated, the reduction gearing extending to one of the wheels 32 of the pair adjacent the front end of the car. The other differential shaft, which is a short stub shaft, drives reduction gearing leading through a double universal joint, or the like, which is mounted on a substantially horizontal axis and drives the adjacent wheel 32. The details of the differential 35 and laterally extending shafts are disclosed in my Patent No. 2,381,672, dated August 7, 1945, and, consequently, this structure is not again here illustrated in detail.

Figure 5:
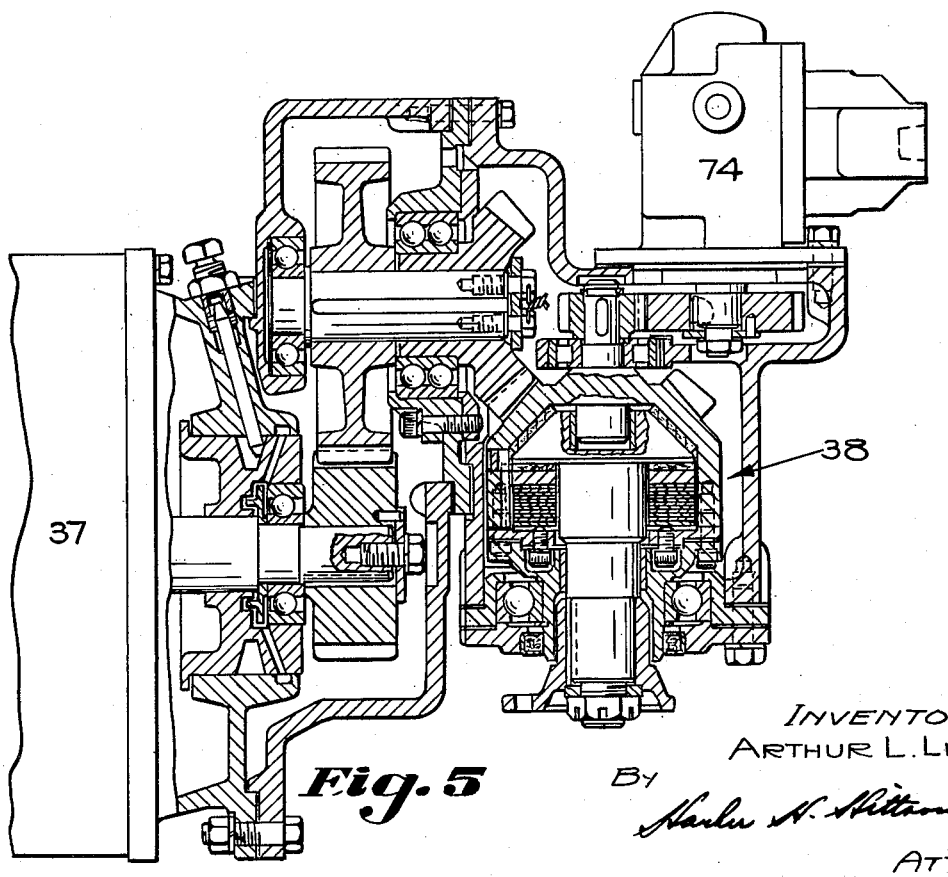
Fig. 5 is a sectional view showing the drive gearing from a primary driving motor through an overload clutch by which the pair of wheels adjacent the discharge end of the vehicle is driven, and a brake actuating pump driven by said gearing.

Adjacent the rear end of the shuttle car there is another electric motor 37 which drives an overload release clutch 38 through drive gearing illustrated in Fig. 5 of the drawings. It may be stated that interposed between the motor 33 and shaft 34 there is an overload release clutch 39 which is similar to the overload release clutch 38 illustrated in detail in Fig. 5. Extending from the clutch 38 and driven thereby is a drive shaft 40, see Fig. 1, which has a driving connection with a differential 41 through universal joints at opposite ends of said shaft 40. Differential 41 is preferably identical with differential 35, both being in accordance with my Patent No. 2,381,672, and the two drive shafts which extend laterally therefrom drive the rear pair of wheels 31 at opposite sides of the shuttle car. This drive gearing includes a transverse drive shaft 42 which leads to a reduction gearing housing 43 which has the same construction as the housing of the differential 35 but the differential is omitted and a straight stub shaft substituted, as suggested, for example, in my Patent No. 2,457,569, previously mentioned.

In the preferred embodiment of my invention, all four of the wheels 31 and 32 are power-driven, as above described. However, in certain broader aspects, only one pair of said wheels may be power-driven. Furthermore, in the preferred embodiment of my invention, all four of the wheels 31 and 32 are steerable, although in certain broader aspects of my invention only a single pair may be steered. A portion of the linkage mechanism for steering said four wheels is indicated at 44 in Fig. 1 of the drawings.

By reference to Figs. 1 and 2 of the drawings, it will be seen that a steering wheel assembly 45 is located at the operator's station 29. This steering wheel assembly is dual in character since the operator must be able to reverse his position in order to operate the shuttle car with equal facility, whether traveling forwardly or reversely. To this end, there are dual controls at the operator's station 29, including separate seats 46 and 47, located at opposite sides of the steering wheel assembly 45.

Figure 3:
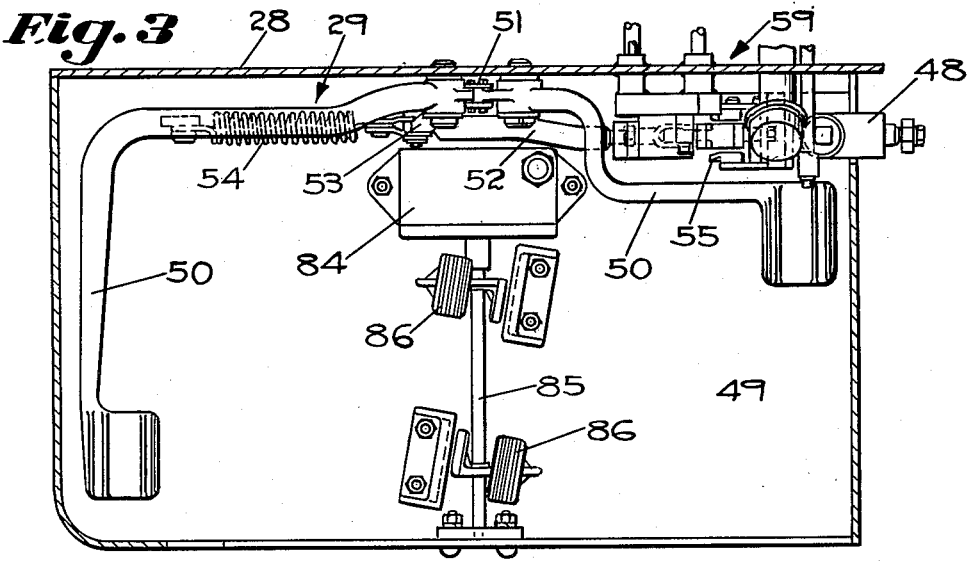
Fig. 3 is an enlarged plan view showing brake operating mechanism and the electric starter switch control mechanism of the shuttle car.

Attention is now directed to the improved braking system which I employ. Each of the wheels 31, 32 is provided with a hydraulically operated brake mechanism of standard construction, the four brake cylinders being actuated from a master cylinder 48 (see Figs. 3 and 4) which is of standard construction. The actuating mechanism for the master cylinder 48 includes some improvements, constituting a feature of my invention, which shall now be described.

At the operator's station 29 there is a platform 49 on which an operator can stand or rest his feet while sitting on either seat 46, 47. Adjacent said platform 49 and pivotally mounted on horizontal axes are duplex foot brake levers 50 which are inter-connected by a link 51 so that actuation of either of them will have the same effect to operate adjustable rod 52 through an arm 53 integral with one of the levers 50. A spring 54 urges the brake levers 50 to the off position. Rod 52 is pivotally attached to the lower end of an operating yoke 55 which is pivotally attached to the operating head 56 of the master cylinder 48 (see Fig. 6). The upper end of the yoke 55 is pivotally connected to a link 57, the other end of which is connected to a cross head 58 of a booster control valve mechanism 59 which operates automatically by virtue of the operator pressing on either of the brake levers 50 so as to boost the action of the mechanical linkage above described in actuating the master cylinder 48.

Associated with the head 56 of the master cylinder 48 is a booster piston motor 60 which includes a main casting 61 having a piston 62 reciprocating in a bore thereof. A removable head 63 is provided for the casting 61. Hydraulic fluid may be delivered to and from the piston 62 over pipe or conduit 64, as controlled by valve 59. It is obvious that whenever hydraulic pressure is applied to conduit 64 it will be delivered over obvious passageways to the left-hand end of cylinder 62, as viewed in Fig. 6 of the drawings, thus forcing the piston 62 to the right, which force will be transmitted to the head 56 and through it to actuate the master cylinder 48 and apply the brakes. The valve 59 is of the follow-up type so that the actuation or release of the boosting power of the actuator 60 is automatically applied or released as the operator pushes on one of the manually controllable levers 50.

The valve 59 includes a main casting or body 65 which is mounted on the plate 28 along with the body or casting 61 of booster actuator 60. On the right-hand end the casting 65 is provided with a built up head 66 which is clamped on by a pair of elongated bolts 67 which provides obvious stops between which the cross head 58 may reciprocate. Cross head 58 is carried on the right-hand end of an actuating plunger 68 reciprocably mounted in a bore 69 in the head 66 which is in alignment with a through cylindrical bore in the casting 65. Within the bore 69 is a valve core 70 provided with spaced lands at opposite ends having a reduced portion therebetween. A spring 71 is interposed between the operating plunger 68 and the core 70. At the left-hand end the casting 65 is provided with a pair of stacked heads 72 and 73, removably attached thereto by screws which thread into casting 65.

Hydraulic fluid from a pump 74 may be derived from a tank 75 and delivered over pressure conduit or line 76 to a chamber 77 in permanent communication with the central part of bore 69. The previously mentioned conduit 64 is also in permanent communication with pressure conduit 76, as provided by appropriate passageways in the casting 65 and in the heads 72, 73, as clearly illustrated in Fig. 6 of the drawings. However, with the brake actuating levers 50 released there is a normal no-load by-pass provided for the pump 74 and this is effected when the parts of valve 59 are in the positions illustrated in Fig. 6 of the drawings. That is, the reduced portion of the core 70 provides a fluid passage between the chamber 77 and a drain chamber 78 which is in permanent communication with a drain or return pipe or conduit 79.

Upon an operator pushing a brake lever 50, the yoke 55 will tend to swing about its pivotal connection to the head 56 which is a trunnion connection designated 59 in Fig. 4 of the drawings. This movement will swing the upper end of the yoke 55 to the left, as viewed in Figs. 4 and 6 of the drawings, moving the cross head 58 and plunger 68 to the left, along with the valve core 70 which is actuated through the compression of spring 71. This will close the no-load by-pass above described by moving the right-hand land of core 70 between the valve chambers 77 and 78. Hydraulic pressure will thus develop in the line 76 and be transferred to conduit 64 with which it is in constant communication, actuating the piston 62 and moving the head 56 to the right, thus actuating the master cylinder of the brake system when applying the brakes. This movement of the master cylinder will, of course, change the pivot point 80, seen in Fig. 4, in a direction which will tend to restore the valve core 70 to its by-passing position, thus providing the follow-up characteristic above described, so that if additional braking action is desired by the operator he will merely continue to depress one of the brake levers 50 in an entirely natural manner to operate direct actuating hydraulic brakes.

To provide restoring pressure, tending to move the core 70 to its neutral or by-passing position, hydraulic fluid connected to the chamber 77 is also delivered over an obvious path to a central chamber in the head 73 where it acts upon a small pin-like piston 81 which abuts the left-hand end of core 70 and extends through a coil spring 82 which also urges the core 70 to its neutral or by-passing position. Obvious leakage passageways are provided to drain off any hydraulic fluid which leaks past the end lands of the core 70, this leakage fluid being delivered to leakage line 83 which also drains leakage from the pump 74 and from the motor 60.

By referring to Fig. 5 of the drawings it will be noted that in the preferred form of my invention, the pump 74 is driven from the electric motor 37 by being geared to the positively driven side of the overload release clutch 38. In this arrangement, therefore, the pump 74 will normally only operate to produce a flow of hydraulic fluid or develop hydraulic pressure when the vehicle is moving. I contemplate an arrangement, however, in which the pump 74 is continuously driven independently of the movement of the vehicle, in which case booster action for the brakes will be available, regardless of the movement of the vehicle. In general, however, this booster action will only be required when the vehicle is moving, which is the thought behind the arrangement disclosed, thus relieving the pump 74 of doing any work except under conditions where that work would be usefully applied.

Mounted on the platform 49 is a reversely operable control switch 84 which preferably has two positions in each direction of movement. The switch 84 provides two-speed control of a relay starter system, not disclosed in detail, for controlling the reverse travel of the shuttle car. Said switch 84 is controlled by a rod 85 mounted for rotary movement and carrying a pair of reversely positioned operating pedals 86 so that switch 84 can be readily controlled by an operator, regardless of which direction he is facing.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

A follow-up valve for use in a hydraulic brake system including a master cylinder, and a hydraulic booster motor for said master cylinder, said follow-up valve being adapted to control the pressure of hydraulic fluid in said booster motor and including means forming a housing having axially aligned axial bores therein each forming a cylinder, said cylinder having different diameters, said housing also forming spaced pressure and exhaust chambers associated with the cylinder of larger diameter, an operating plunger reciprocably mounted in said cylinder of larger diameter, a valve core in said cylinder of larger diameter provided with spaced lands at opposite ends and a reduced diameter portion therebetween adapted to interconnect said spaced pressure and exhaust chambers whereby hydraulic fluid entering said pressure chamber is by-passed when said booster motor is inoperative, a spring between said operating plunger and said valve core, means forming a piston in the smaller of said cylinders and at the end of said valve core opposite said operating plunger, and spring means urging said valve core toward said operating plunger, said valve housing providing interconnected hydraulic fluid passageways connected with said pressure chamber, an end of said piston opposite said valve core and adapted to lead to said booster motor whereby when said core is urged by said operating plunger and spring to restrict the flow of hydraulic fluid from said pressure chamber to said exhaust chamber said piston is subjected to the increased pressure in the pressure chamber thereby tending to move said valve core toward said operating plunger to reconnect said pressure and exhaust chambers.

ARTHUR L. LEE.

References Cited in the file of this patent

UNITED STATES PATENTS

| Number | Name | Date |
|---|---|---|
| 2,218,191 | Dick | Oct. 15, 1940 |
| 2,343,698 | Parnell | Mar. 7, 1944 |
| 2,360,578 | Porter | Oct. 17, 1944 |
| 2,402,115 | Levy | June 11, 1946 |
| 2,472,695 | Chouings | June 7, 1949 |
| 2,574,556 | Good | Nov. 13, 1951 |

FOREIGN PATENTS

| Number | Country | Date |
|---|---|---|
| 835,760 | France | Oct. 3, 1938 |